United States Patent
Gunter et al.

(10) Patent No.: US 8,876,046 B2
(45) Date of Patent: Nov. 4, 2014

(54) REMOTELY ACTUATED WIND TUNNEL MODEL RUDDER USING SHAPE MEMORY ALLOY

(75) Inventors: Ian Gunter, Burien, WA (US); Robert T. Ruggeri, Kirkland, WA (US); James H. Mabe, Seattle, WA (US); Darin Arbogast, Seattle, WA (US); Ordie D. Butterfield, Bonney Lake, WA (US); Daniel Morgenroth, Kent, WA (US)

(73) Assignee: The Boeing Company, Chicago, IL (US)

( * ) Notice: Subject to any disclaimer, the term of this patent is extended or adjusted under 35 U.S.C. 154(b) by 567 days.

(21) Appl. No.: 12/880,004

(22) Filed: Sep. 10, 2010

(65) Prior Publication Data

US 2012/0060491 A1  Mar. 15, 2012

(51) Int. Cl.
  *B64C 13/00* (2006.01)
  *F03G 7/06* (2006.01)

(52) U.S. Cl.
  CPC ..................... *F03G 7/065* (2013.01)
  USPC ........................................ 244/99.8

(58) Field of Classification Search
  USPC ................................. 244/99.8, 87
  See application file for complete search history.

(56) References Cited

U.S. PATENT DOCUMENTS

| 4,695,014 | A | * | 9/1987 | Mourani ........................ 244/213 |
|---|---|---|---|---|
| 4,700,541 | A | | 10/1987 | Gabriel et al. |
| 4,761,955 | A | | 8/1988 | Bloch |
| 4,798,051 | A | | 1/1989 | Foote |
| 5,127,228 | A | * | 7/1992 | Swenson ......................... 60/527 |
| 5,396,769 | A | * | 3/1995 | Brudnicki ........................ 60/528 |
| 5,816,923 | A | | 10/1998 | Milo et al. |
| 5,836,066 | A | | 11/1998 | Ingram |
| 5,975,468 | A | * | 11/1999 | Moignier et al. .......... 244/172.7 |
| 6,065,934 | A | * | 5/2000 | Jacot et al. ..................... 416/155 |
| 6,272,857 | B1 | | 8/2001 | Varma |
| 6,453,669 | B2 | | 9/2002 | Kennedy et al. |
| 7,037,076 | B2 | | 5/2006 | Jacot et al. |
| 7,350,762 | B2 | | 4/2008 | MacGregor et al. |
| 7,878,459 | B2 | * | 2/2011 | Mabe et al. .................... 244/213 |
| 7,954,769 | B2 | * | 6/2011 | Bushnell ....................... 244/213 |
| 2005/0198777 | A1 | | 9/2005 | Mabe |
| 2006/0191267 | A1 | | 8/2006 | Song et al. |
| 2009/0179109 | A1 | | 7/2009 | Akkermann et al. |

* cited by examiner

*Primary Examiner* — Tien Dinh
*Assistant Examiner* — Keith L Dixon
(74) *Attorney, Agent, or Firm* — Felix L. Fischer

(57) ABSTRACT

A rotational actuator assembly employs a first torsion actuator having a shape memory alloy (SMA) tube with a first trained twist direction and a second torsion actuator having a SMA tube with an opposite trained twist direction collinear with the first torsion actuator with abutting proximal ends. A central fitting joins the proximal ends. A control system for temperature control of the first torsion actuator and second torsion actuator about an average temperature provides combined antagonistic rotation of the central fitting.

16 Claims, 5 Drawing Sheets

REMOTELY ACTUATED WIND TUNNEL MODEL RUDDER USING SHAPE MEMORY ALLOY

BACKGROUND INFORMATION

1. Field

Embodiments of the disclosure relate generally to the field of control surface actuation systems and more particularly to embodiments for a shape memory alloy actuator with dual collinear shape memory alloy tubes having antagonistic reaction about a control temperature point.

2. Background

Wind tunnel models typically require movable control surfaces to allow simulation of various control aspects of the vehicle being modeled. Unmotorized surfaces are often used due to their simplicity. However, such surfaces must be positioned by hand requiring interruption of testing to position the surfaces at desired control angles. Models are typically of reduced scale and therefore full size actuators which would be employed in actual vehicles are not readily adaptable for use. Various actuation systems have been employed in wind tunnel models including electromechanical actuators and shape memory alloy (SMA) actuators using wires for hinge moment actuation using differential pull from SMA wires. However, electromechanical actuation is relatively bulky because of low power densities and the need for complex electric motor/gear assemblies. As such, the amount of space required in the supporting structure (for example in a vertical tail) may limit the amount of instrumentation such as pressure sensors that can be installed in the model and may reduce the structural strength which tends to limit their use to lower pressure tunnels having lower loads. Lower pressure tunnels do not match the aerodynamic characteristics of a full scale airplane as well which limits their fidelity as design tools for testing aircraft configurations. SMA wire actuation has limited power and strength, and therefore is similarly suitable for low pressure wind tunnel testing only.

It is therefore desirable to provide actuators for use in models, or other space constrained applications, to improve wind tunnel test efficiency by reducing the number of times the wind tunnel has to be opened to complete model changes while providing an actuator with sufficient force capability for higher pressure wind tunnels. It is also desirable to provide an actuator having power density much greater than traditional solutions for actuated control surfaces allowing its implementation into applications requiring higher forces and into more restrictive spaces. It is further desirable to provide an actuator with the ability to place the actuating elements on the hinge line of a control surface.

SUMMARY

Embodiments disclosed herein provide a rotational actuator assembly having a first torsion actuator incorporating a shape memory alloy (SMA) tube with a first trained twist direction and a second torsion actuator having a SMA tube with an opposite trained twist direction collinear with the first torsion actuator and having abutting proximal ends. A central fitting joins the proximal ends for fixed common rotational movement. A control system for temperature control of the first torsion actuator and second torsion actuator about an average temperature provides combined antagonistic rotation of the central fitting for the desired angular displacement.

In one exemplary embodiment, a wind tunnel model rudder actuator assembly incorporates a first torsion actuator aligned on a hinge line between a vertical stabilizer and a rudder control surface and having a shape memory alloy (SMA) tube with a first trained twist direction and having a proximal end and a distal end and a second torsion actuator having a SMA tube with a trained twist direction opposite to the first trained twist direction. having a proximal end and a distal end. The second torsion actuator is collinear with the first torsion actuator with the proximal ends of the first and second torsion actuator substantially abutting. A central fitting joins the proximal ends and has a control tang attached to the rudder control surface. A control system controls temperature of the first torsion actuator and second torsion actuator for combined antagonistic rotation of the central fitting.

A method for rotational actuation is accomplished with the disclosed embodiments by aligning a first torsion actuator having a shape memory alloy (SMA) tube with a first trained twist direction with a hinge line for an actuation surface and aligning a second torsion actuator having a SMA tube with an opposite trained twist direction collinear with the first torsion actuator. Proximal ends of the first and second torsion actuator are joined at a central fitting. Temperature of the first and second torsion actuators are controlled about a selected average temperature for antagonistic rotation of the central fitting.

The features, functions, and advantages that have been discussed can be achieved independently in various embodiments of the present disclosure or may be combined in yet other embodiments further details of which can be seen with reference to the following description and drawings.

DETAILED DESCRIPTION

The embodiments described herein with respect to wind tunnel model use provide an actuator that employs two shape memory alloy (SMA) tubes trained to twist in opposite directions as the tubes are heated. The tubes are centrally coupled together collinearly on the hinge line of the actuator. The ends of the tubes opposite the coupling are fixed to an operating surface attachment of the actuator. Heat is applied using cartridge heaters inside the tubes and controlled by a computerized control system. This actuator configuration allows the actuating elements to be packaged in a space where traditional actuators for a given load would not fit. The power density of the actuator provided by the antagonistic counter-rotation of the two actuator tubes also allows for much higher actuation forces than would be possible with traditional designs and actuation train consists of only three moving parts greatly reducing the complexity.

Figure 1:
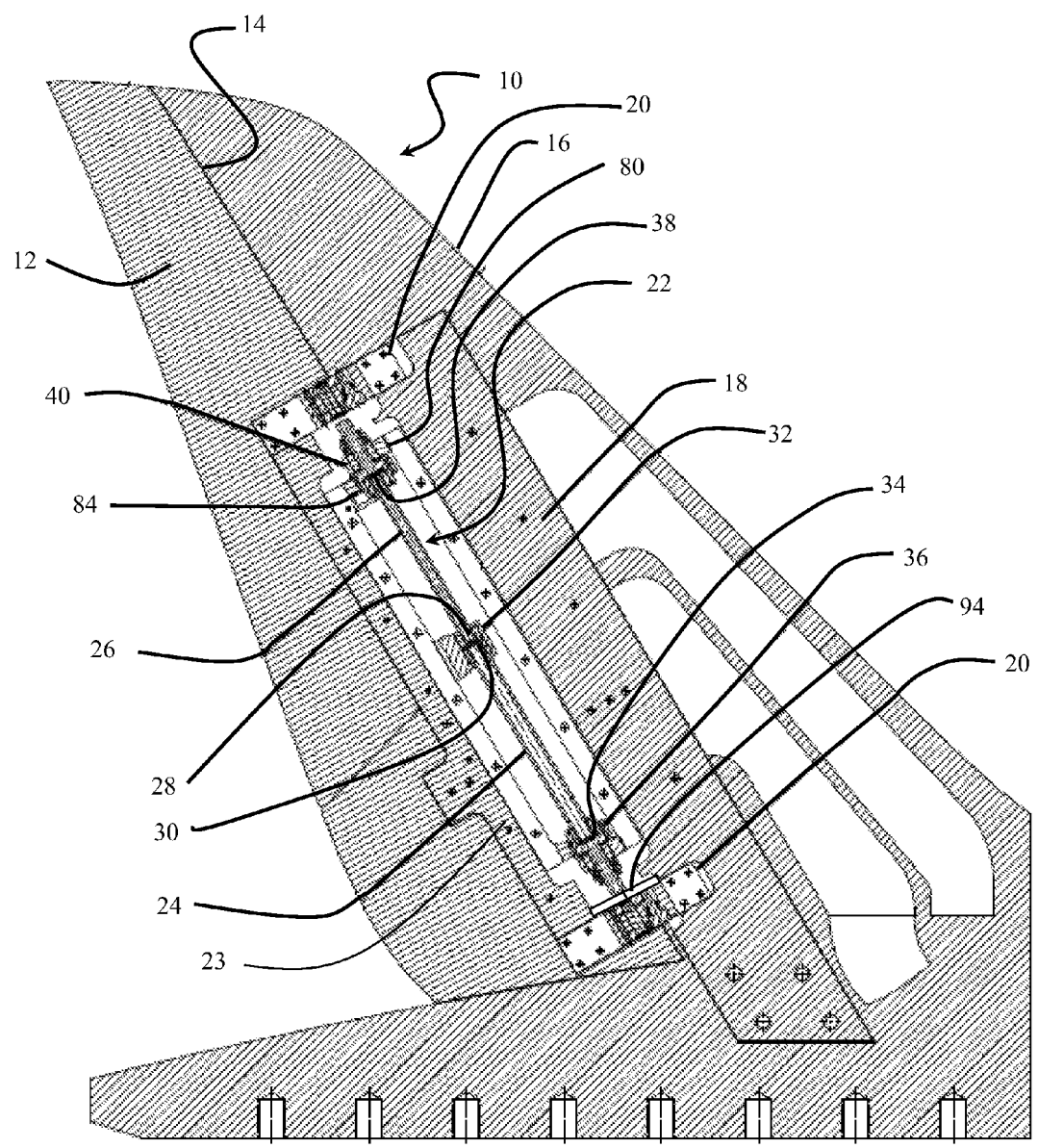
FIG. 1 is a side section view of an embodiment employed in a wind tunnel model rudder.

Referring to the drawings, FIG. 1 a rudder assembly 10 for a wind tunnel model incorporates a rudder control surface 12 which is attached along a hinge line 14 to a vertical stabilizer 16. A spar 18 provides structural support for the stabilizer and attachment points for the rudder hinges 20 and actuator assembly 22. Similarly, spar 23 provides structural support for the rudder control surface and attachment points for the actuator assembly to the rudder control surface. Actuator assembly 22 incorporates a first shape memory alloy (SMA) torsion actuator 24 and a second SMA torsion actuator 26 which are collinear and engaged to one another at proximal ends 28, 30 in a central fitting 32. Distal end 34 of the first torsion actuator is constrained in a first end clamp assembly 36 and distal end 38 of the second torsion actuator is constrained in a second end clamp assembly 40.

Figure 2:
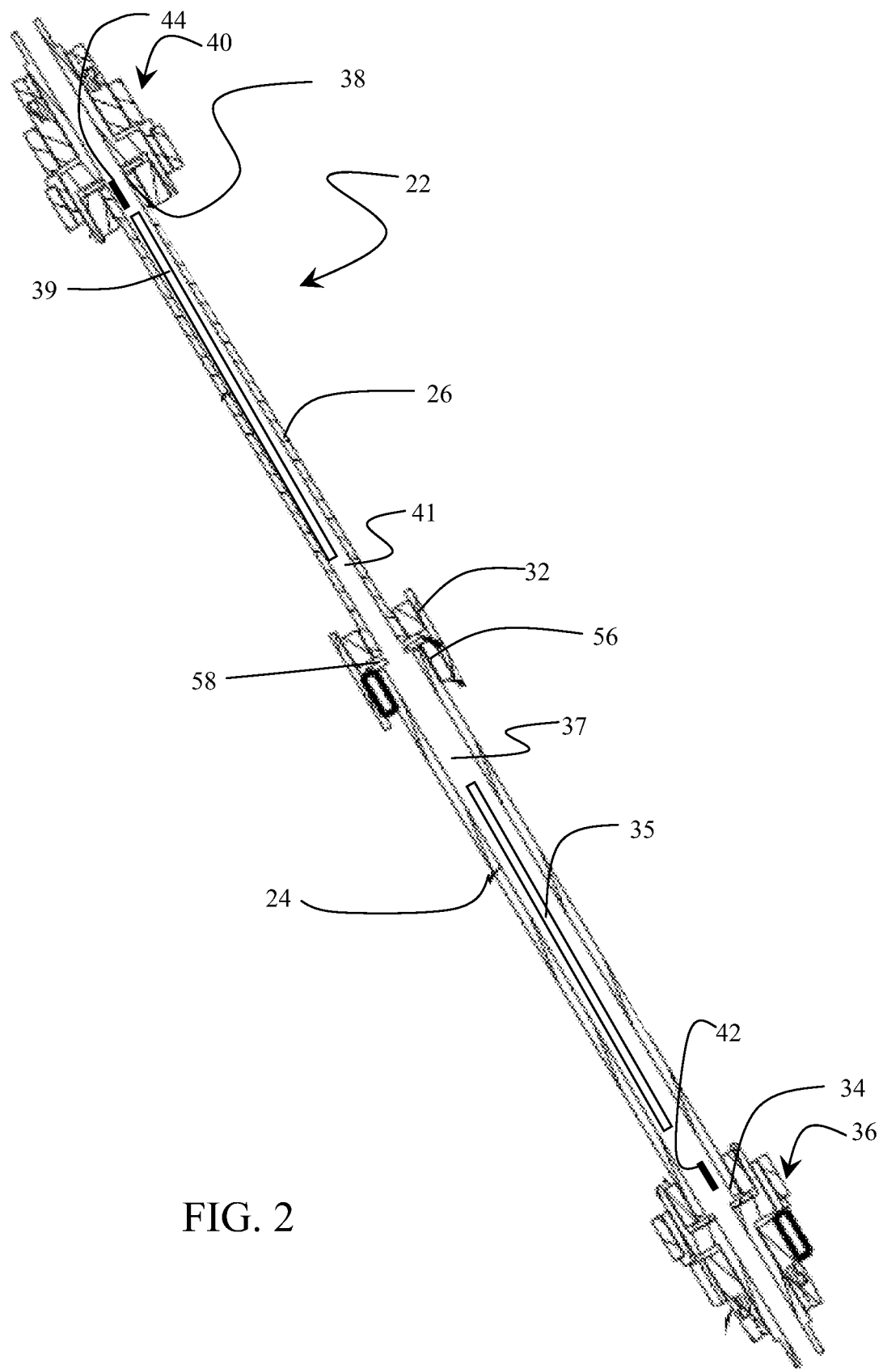
FIG. 2 is a front isometric section view of the actuator assembly showing the actuation tubes and support structure of the embodiment of FIG. 1.

Details of the actuator assembly 22 are seen in FIG. 2. First torsion actuator 24 and second torsion actuator 26 are constrained at the distal ends 34 and 38 respectively, as will be described in greater detail subsequently, and have trained memory torsion in opposite directions. For the exemplary embodiments, the torsion actuators are Nickel/Titanium alloy SMA tubes. An alloy content of 55 wt % Ni 45 wt % Ti is employed in the exemplary embodiment. Cooling the first torsion actuator and proportionally heating the second torsion actuator from an average control temperature will result in common rotation of the proximal ends 28 and 30 of the SMA tubes of the actuators and the associated central fitting 32. This antagonistic rotational memory of the tube pair allows very precise control of positioning created by the actuator with offsetting torsion of the two SMA tubes. Cartridge heater 35 contained within a central bore 37 in the SMA tube of first torsion actuator 24 and cartridge heater 39 contained within a central bore 41 in the SMA tube of second torsion actuator 26 provide the temperature control for actuation. Temperature sensors such as thermocouples 42 and 44 provide measurement of actual temperatures of the SMA tubes. While two thermocouples are shown, multiple thermocouples may be employed in alternative embodiments and placement of the thermocouples may be altered for desired control characteristics. In the embodiment shown, the SMA tubes of the first torsion actuator and second torsion actuator are of different diameters. In alternative embodiments, the tube diameters and cross sections may be altered for particular design requirements.

Figure 3:
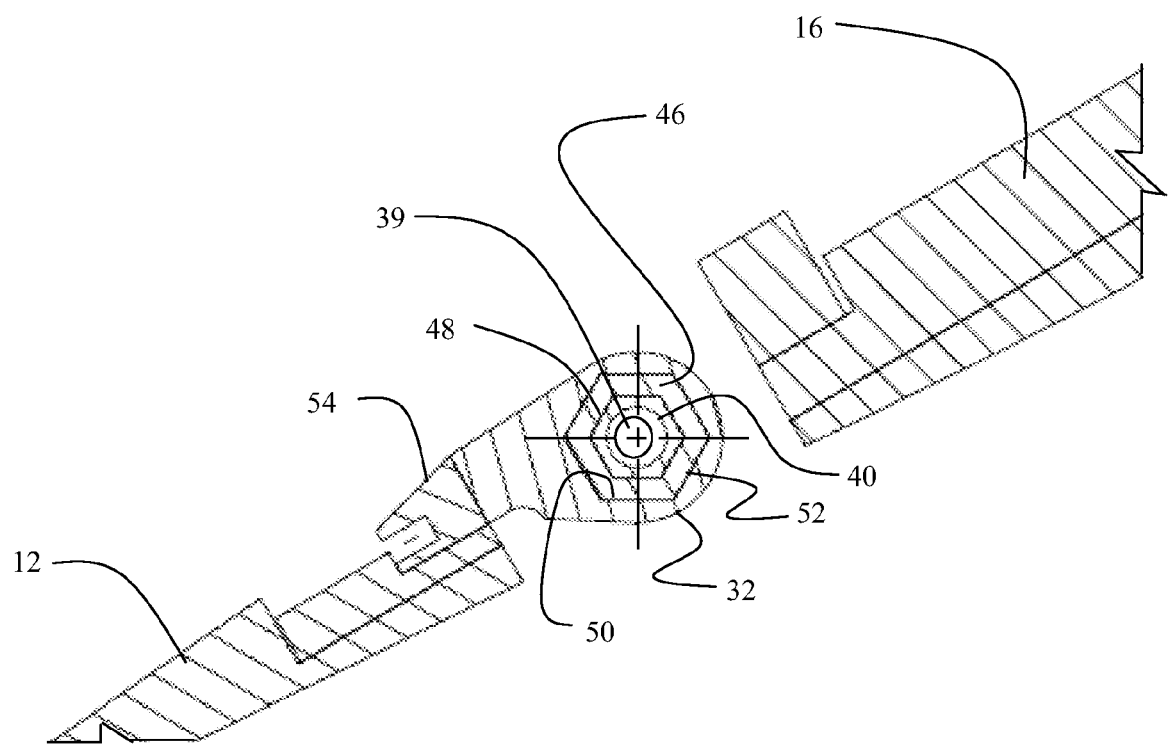
FIG. 3 is a top section view showing details of the central fitting and actuation tubes interconnection.

As seen in FIG. 3 for the exemplary embodiment, the proximal ends of the SMA tubes of the actuators (second actuator 26 shown in the top section view provided) are hexagonal in external cross section with central bore 40 being circular to accommodate the cartridge heater 38. A hexagonal cylinder insulator 46 is employed for interconnection of the actuator and has an internal hexagonal bore 48 to receive the proximal end of the second actuator and an external hexagonal profile 50 received in a hexagonal bore 52 in central fitting 32 for transfer of rotational force from the actuator to the fitting. A surface actuation tang 54 extends from the central fitting for attachment to the rudder control surface 12. While hexagonal interconnections have been shown in the drawings for the exemplary embodiment, alternative embodiments to cooperatively engage the insulator, proximal end and central fitting bore for common rotation may employ other geometric configurations or rotational interconnections such as pinned connections, splined connections or blade key and slot. As best seen in FIG. 2, proximal end 28 of first actuator 24 is similarly constrained within an insulator 56 received within the central fitting. A washer insulator 58 separates the proximal ends of the actuators.

Figure 4:
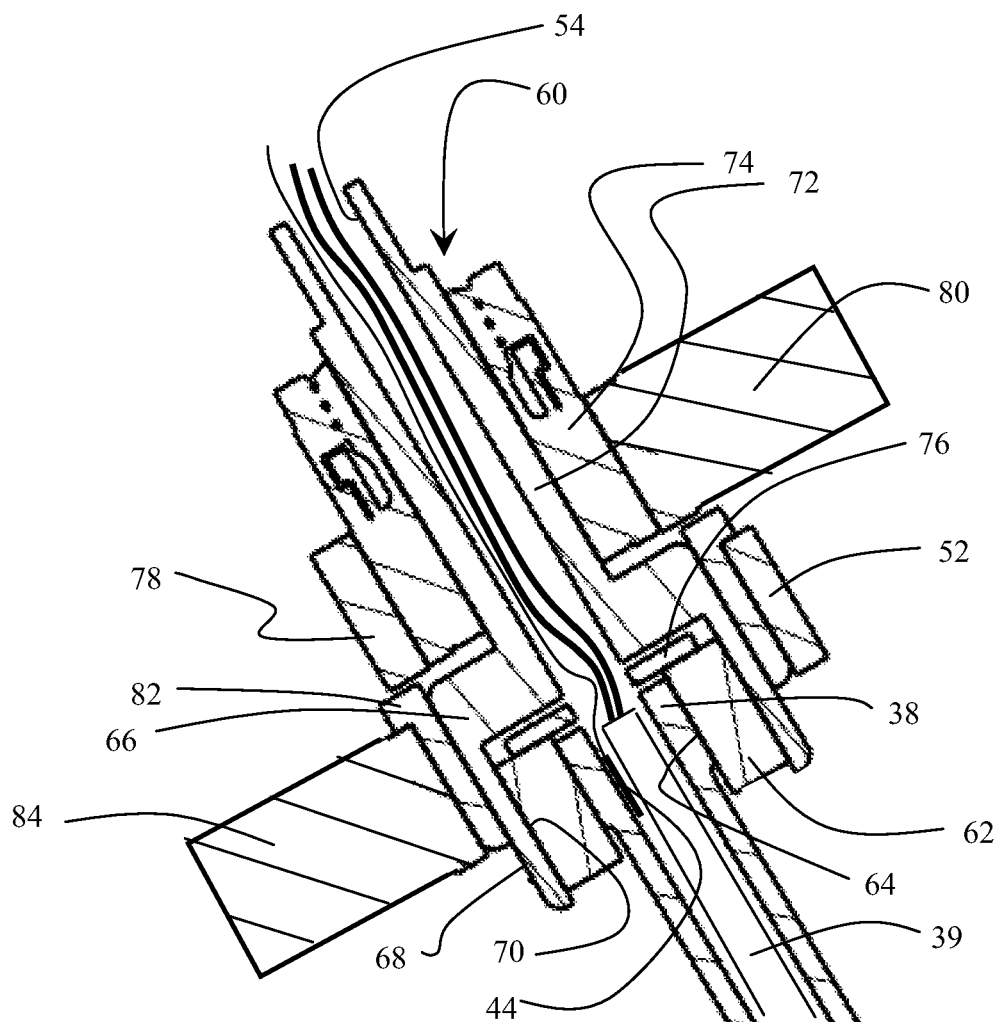
FIG. 4 is a side section view of the preload adjustment assembly of the actuation tube support structure; and, FIG. 5 is a flow chart of a control method for the embodiment of FIG. 1.

The distal ends of the torsion actuator tubes which are located at the opposite ends from the central fitting are constrained in end clamp assemblies 36 and 40. Each end clamp assembly incorporates a preload adjustment assembly 60 as shown in FIG. 4 for the second torsion actuator 26. Distal end 38 is received in an insulator 62. As described with respect to the proximal ends and the central fitting, insulator 62 is a hexagonal cylinder having a hexagonal bore 64 to receive a hexagonal section of the distal end 38 of the SMA tube in the torsion actuator. A rotation adjustment axle 66 has a receiving portion 68 for the insulator which incorporates a hexagonal bore 70 providing rotational engagement of the axle, insulator and SMA tube distal end. Insulator 62 provides radial thermal insulation between the SMA tube and the axle. As with the central fitting, while hexagonal interconnections have been shown in the drawings for the exemplary embodiment, alternative embodiments to cooperatively engage the insulator, distal end and adjustment axle receiving portion bore for common rotation may employ other geometric configurations or rotational interconnections such as pinned connections, splined connections or blade key and slot. Axle 66 has a frictional engagement portion 72 which is received in a preload adjustment fitting 74. The axle may be manipulated to rotate and preload the distal end of the SMA tube and then secured with the preload adjustment fitting. Distal end 38 of the SMA tube is also longitudinally thermally insulated from the axle receiving portion with an insulating washer 76.

A collar 78 having an attachment flange 80 fixes the adjustment assembly and the distal end of the torsion actuator to spar 18 in the vertical stabilizer 16. A second collar 82 having an attachment flange 84 is connected to spar 23 in the rudder control surface 12 (as shown in FIG. 1). The adjustment assembly carries collar 82 with a rotational bushing 86 providing an end connection for free rotation of the attached rudder control surface through collar 82 with angular rotational input to the rudder control surface from the central fitting 32. For the embodiment described a rotational range of 13° is provided by the actuator assembly to the rudder control surface.

Figure 5:
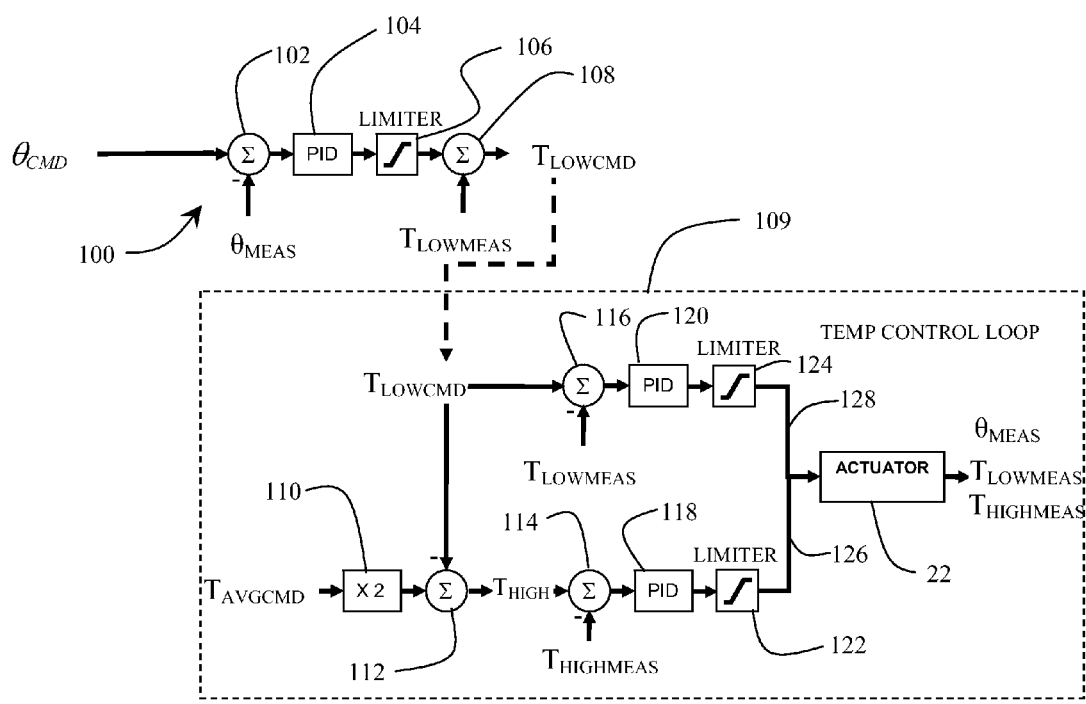

As previously described, torsion actuators 24 and 26 employ SMA tubes which are torsionally reactive in opposite directions. Control of the actuator position at the central fitting is created by establishing an average control temperature, $T_{AVG}$, corresponding to an intermediate phase for both actuators and a neutral (or aligned) position for the rudder control surface. A low temperature control point, $T_{LOWMAX}$, corresponding to a substantially martensitic phase of one torsion actuator and a substantially austenitic phase of the second torsion actuator results in a fully deflected position to one side for the rudder control surface. A high temperature control point, $T_{HIGHMAX}$, corresponding to a substantially austenitic phase for the first torsion actuator and a substantially martensitic phase for the second torsion actuator results in a fully deflected position to the opposite side for the rudder control surface. As shown in FIG. 5, a desired angular position command, $\theta_{CMD}$, is input into a position control module 100. For the embodiment shown, the control module is a software implementation in a computer control system. In alternative embodiments, the control module may be an analog or programmable gate array (PGA) implementation of the control algorithm. An angular measurement, $\theta_{MEAS}$, is input from an angular position indicator 94 (shown in FIG. 1) measuring actual angular position of the rudder control surface for comparison to the commanded angle in summer 102. For the exemplary embodiment, a hall sensor detecting relative position of two magnets associated with the rudder control surface is calibrated to provide the angle position. In alternative embodiments, a potentiometer attached rudder control surface or other angular measurement sensor is employed. The resulting command differential is provided through Proportional-Integral-Derivative (PID) controller 104 and limiter 106 as a low temperature control signal for the first torsion actuator. Comparison of the commanded low temperature control signal to an actual temperature measurement, $T_{LOW\ MEAS}$, from thermocouple 42 through summer 108 results in a Low Temperature command, $T_{LOW\ CMD}$, output.

A temperature control loop 108 receives the $T_{LOW\ CMD}$ and combines $T_{LOW\ CMD}$ with $T_{AVG\ CMD}$, received through multiplier 110, in summer 112 to create a corresponding required high temperature for the second torsion actuator, $T_{HIGH}$. $T_{HIGH}$ is compared to the actual temperature measurement from thermocouple 44, $T_{HIGHMEAS}$, in summer 114. $T_{LOW\ CMD}$ is compared to $T_{LOWMEAS}$ in summer 116. Outputs from summers 114 and 116 are then provided through PIDs 118, 120 and limiters 122, 124 respectively to create actual current requirement outputs 126, 128 for cartridge heaters 34, 38 in actuator 22. Actual position, $\theta_{MEAS}$, and actual SMA tube temperatures, $T_{LOW\ MEAS}$ and $T_{HIGH\ MEAS}$, are then measured for feedback control. For the exemplary embodiment $T_{LOWMAX}$ and $T_{HIGHMAX}$ are approximately 30.5 C and 110.5 C providing a $T_{AVG}$ of around 71 C.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A rotational actuator assembly comprising:
   a first torsion actuator mounted to a control surface and having a shape memory alloy (SMA) tube with a first trained twist direction and having a first proximal end and a first distal end;
   a second torsion actuator mounted to the control surface and having a SMA tube with a second trained twist direction opposite to the first trained twist direction and having a second proximal end near the first proximal end and a distal end opposite the second proximal end, said second torsion actuator collinear with the first torsion actuator with the first and second proximal ends engaged to one another;
   a first heater received in a bore in the first torsion actuator and a second heater received in a bore in the second torsion actuator;
   a central fitting joining the first and second proximal ends; and
   a control system having a position control module responsive to an angular position command providing a low temperature command as an input to a temperature control loop adjusting temperatures of the first heater and second heater about an average control temperature, the control system operable to control a temperature of the first torsion actuator and the second torsion actuator about the average temperature, to cause torsion of the first torsion actuator and torsion of the second torsion actuator in an opposite direction.

2. The rotational actuator assembly as defined in claim 1 further comprising:
   a first end clamp assembly constraining the distal end of the first torsion actuator; and,
   a second end clamp assembly constraining the distal end of the second torsion actuator.

3. The rotational actuator assembly as defined in claim 2 wherein at least one of the first and second end clamp assemblies includes a preload adjustment assembly.

4. The rotational actuator assembly as defined in claim 3 wherein the preload adjustment assembly comprises a rotation adjustment axle receiving the distal end.

5. The rotational actuator assembly as defined in claim 4 wherein the rotation adjustment axle includes a receiving portion having a bore to receive the distal end and further including an insulator intermediate the bore and distal end, said insulator, distal end and bore cooperatively shaped to rotationally constrain the distal end.

6. The rotational actuator assembly as defined in claim 5 wherein the rotation adjustment axle further includes a frictional engagement portion and further comprising a preload adjustment fitting receiving the frictional engagement portion.

7. The rotational actuator assembly as defined in claim 6 further comprising a collar with an attachment flange engaging the preload adjustment fitting to secure the distal end.

8. The rotational actuator assembly as defined in claim 1 further comprising an at least one insulator intermediate the proximal ends and the central fitting, said insulator, central fitting and proximal ends cooperatively shaped to rotationally constrain the proximal ends.

9. A wind tunnel model rudder actuator assembly comprising:
   a first torsion actuator aligned on a hinge line between a vertical stabilizer and a rudder control surface and having a shape memory alloy (SMA) tube with a first trained twist direction and having a proximal end and a distal end;
   a second torsion actuator having a SMA tube with a trained twist direction opposite to the first trained twist direction and having a proximal end and a distal end, said second torsion actuator collinear with the first torsion actuator with substantially abutting proximal ends;
   a first heater received in a bore in the first torsion actuator and a second heater received in a bore in the second torsion actuator;
   a central fitting joining the proximal ends and having a control tang attached to the rudder control surface; and
   a control system for temperature control of the first torsion actuator and second torsion actuator for combined simultaneous actuation through a range of motion in antagonistic rotation of the central fitting, wherein the control system includes a position control module responsive to an angular position command providing a low temperature command as an input to a temperature control loop for adjusting temperatures of the first heater and second heater about an average control temperature operable to provide a temperature range from a first lower temperature corresponding to a substantially martensitic phase of the first torsion actuator and a substantially austenitic phase of the second torsion actuator resulting in a fully deflected position in one direction to a second higher temperature corresponding to a substantially austenitic phase for the first torsion actuator and a substantially martensitic phase for the second torsion actuator fully deflecting the rudder control surface in an opposite direction.

10. The wind tunnel model rudder actuator assembly as defined in claim 9 further comprising:
    a first end clamp assembly constraining the distal end of the first torsion actuator to the vertical stabilizer; and,
    a second end clamp assembly constraining the distal end of the second torsion actuator to the vertical stabilizer.

11. The wind tunnel model rudder actuator assembly as defined in claim 10 wherein the first and second end clamp assemblies include a preload adjustment assembly having a rotation adjustment axle receiving the distal end of the respective torsion actuator, each rotation adjustment axle including a receiving portion having a hexagonal bore to receive a hexagonal cylinder insulator, said insulator having a hexagonal bore to receive a hexagonal cross section of the distal end to rotationally constrain the distal end.

12. The wind tunnel model rudder actuator assembly as defined in claim 11 further comprising:
   a collar with an attachment flange engaging the preload adjustment fitting to secure the distal end to the vertical stabilizer;
   a second collar having an attachment flange connected to the rudder control surface carried by a rotational bushing providing an end connection for free rotation of the attached rudder control surface through the second collar.

13. A method for rotational actuation comprising:
   aligning a first torsion actuator having a shape memory alloy (SMA) tube with a first trained twist direction with a hinge line for an actuation surface;
   aligning a second torsion actuator having a SMA tube with an opposite trained twist direction collinear with the first torsion actuator;
   joining proximal ends of the first and second torsion actuator at a central fitting; and
   inserting a first cartridge heater in the SMA tube of the first torsion actuator;
   inserting a second cartridge heater in the SMA tube of the second torsion actuator;
   controlling temperature of the first and second torsion actuators using the first and second cartridge heaters about a selected average temperature for antagonistic rotation of the central fitting.

14. The method of claim 13 wherein controlling temperature includes:
   receiving an angular position command;
   comparing the angular position command to an actual position of the central fitting;
   providing a first temperature command for the first torsion actuator.

15. The method of claim 14 wherein controlling temperature further includes:
   comparing the first temperature command to the selected average temperature;
   providing a second temperature command responsive to the comparison.

16. The method of claim 15 wherein controlling temperature further includes:
   comparing the first temperature command to an actual temperature of the first torsion actuator;
   comparing the second temperature command to an actual temperature of the second torsion actuator;
   providing current outputs to the first cartridge heater for the first torsion actuator and the second cartridge heater for the second torsion actuator responsive to the first temperature comparison and second temperature comparison respectively.

* * * * *